Jan. 23, 1962     O. W. KIPHART     3,017,746
DISPOSABLE ELASTIC ROCKET CASE
Filed June 16, 1958

INVENTOR.
O.W. KIPHART
BY Hudson and Young
ATTORNEYS

United States Patent Office 3,017,746
Patented Jan. 23, 1962

3,017,746
DISPOSABLE ELASTIC ROCKET CASE
Otta W. Kiphart, McGregor, Tex., assignor to Phillips Petroleum Company, a corporation of Delaware
Filed June 16, 1958, Ser. No. 742,433
4 Claims. (Cl. 60—35.6)

This invention relates to solid propellant rocket motors. In one of its aspects this invention relates to a rocket motor case constructed of elastic material which is case bonded to the propellant grain so as to expand and contract to accommodate the change in volume occasioned by the phase change of ammonium nitrate used as a solid propellant component. In another aspect this invention relates to a rocket motor case which is non-metallic and is consumed at burnout of the propellant.

A rocket motor commonly comprises a rigid metal case, having an exhaust nozzle, and a combustible charge placed within the metal case. The metal case constitutes a considerable proportion of the total cost of the rocket motor and presents a hazard to life and property if such case must be jettisoned over populated areas. Furthermore, these metal cases contribute considerable weight to the rocket motor.

It is, therefore, a principal object of this invention to provide a rocket motor wherein a minimum, if any, of metal is employed in constructing the motor case.

It is also an object of this invention to provide a rocket motor case which is disposable and is consumed after termination of thrust of the propellant.

It is a further object of this invention to provide a rocket motor case which is applied to and firmly bonded to the propellant grain comprising the combustible charge of the rocket.

Still another object of this invention is to provide a rocket motor case which is slightly elastic or yielding so as to compensate for gross volume changes in an ammonium nitrate-containing propellant during temperature cycling.

Other and further objects and advantages of this invention will be apparent to one skilled in the art upon study of the present disclosure including the detailed description and the appended drawing wherein.

Broadly, the invention involves a disposable rocket motor case which is built up from rubber impregnated fibers, rubberized fabric, and/or rubber reinforced with metal wires, by wrapping the rubberized material upon the propellant grain and curing the motor and propellant grain as a unit. Metal head and nozzle assemblies can be spliced into the motor as the case is being built up by layers of the rubberized materials. The rubberized fabric case can be reinforced by incorporating metal wire, sheeted solid polyethylene or hardware cloth into the case as it is being built up from the layers of rubberized fabric. The present invention is applicable to solid propellants in general which have incorporated therein a rubber binder and is particularly applicable to solid propellants comprising a rubber binder together with ammonium nitrate as the oxidizer. Rubber impregnated cords used in the manufacture of automobile and truck tires can be used for preparing the built up rocket case of this invention and such rubber-containing fabrics can be bonded directly to the propellant grain containing a rubber binder. Thus, the slightly yielding rocket motor casing will expand and contract to accommodate changes in volume occasioned by a change in phase of the ammonium nitrate oxidizer of the solid propellant composition. The term "fabric" as employed herein refers to structures made of nylon, oriented and annealed solid polyethylene, cotton, silk, wool or metal, such as hardware cloth.

The built up case can be prepared on a mandrel after which the preformed grain is inserted in the case and the case and grain cured as a unit; however, it is preferred to prepare the grain by extrusion, drilling, machining, or molding, and to use the prepared grain as the mandrel for building up the case thereon. A preferred method for preparing the grain is to extrude the cylindrical portion and to cement thereon the head and nozzle portions, which are machined from blocks of propellant, using rubber cement or polyurethane cement to effect the joint.

Figure 1:
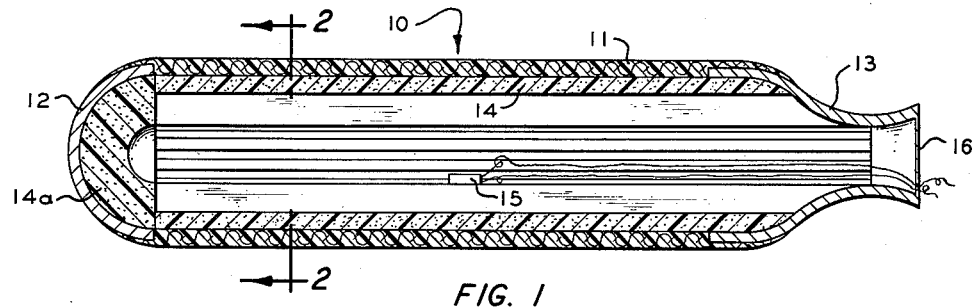
FIGURE 1 shows a cross section of a rocket motor constructed in accordance with my invention.

Reference is now made to the drawing, and particularly to FIGURE 1, wherein a rocket motor containing a solid propellant charge is illustrated comprising the motor case 10 made of the cylindrical portion of build-up tire cord material indicated at 11, metal head plate 12, metal nozzle 13 and the propellant grain 14. The propellant charge can be ignited by conventional means such as an electric squib, indicated at 15, connected to a source of energy, such as a battery (not shown). Prior to ignition, the nozzle of the rocket motor is sealed by metal plate 16 to prevent entry of moisture and to provide a build-up of pressure for ignition.

The rocket motor can be manufactured by cementing the endpiece of propellant, indicated at 14a, to the cylindrical portion 14, cementing head plate 12 and metal nozzle 13 to the propellant grain, and then wrapping the entire assembly with a plurality of layers of rubber impregnated fabric to provide the covering or case 11. The entire unit is then cured. After curing, the igniter 15 and the end plate 16 are placed in position to provide the finished motor.

Figure 2:
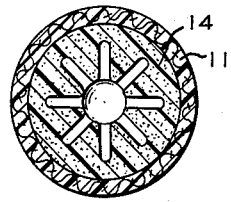
FIGURE 2 is a view along line 2—2 of FIGURE 1.

In the rocket motor case of this invention, using a metal nozzle, the configuration of the perforation of the propellant grain is illustrated in FIGURE 2, which is a view along line 2—2 of the motor of FIGURE 1. A star-shaped perforation is preferred because this configuration provides an internal burning grain which burns with increasing pressure at the beginning period of the combustion, levels off and declines for a period, followed by another rise in pressure near the burnout period. In contrast, a circular perforation burns with an increase in pressure substantially throughout the combusion period to burnout because the burning surface is increased throughout the combustion period.

Figure 3:
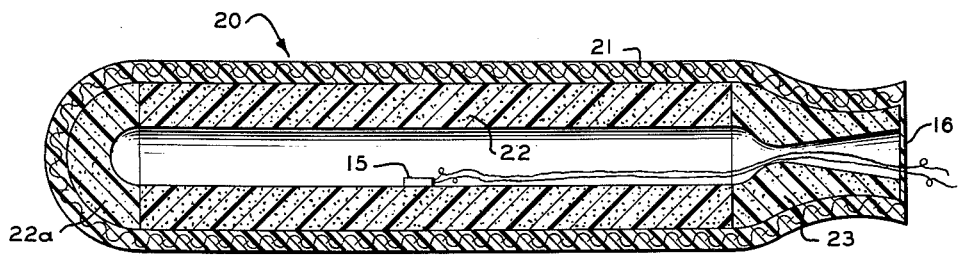
FIGURE 3 is a cross sectional view of a rocket motor constructed according to a modification of my invention.

FIGURE 3 illustrates a modification of the invention wherein no metal parts are used. Rocket motor 20 is composed of rubber impregnated fabric covering 21, cylindrical propellant grain 22, propellant headpiece 22a, and propellant nozzle 23. The nozzle portion 23 of the rocket motor 20 is manufactured from slower burning propellant than the portions 22 and 22a, so that the nozzle configuration is maintained substantially throughout the combustion period. Igniter 15 and nozzle sealing plate 16 are the same as in rocket motor 10 of FIGURE 1. Endpiece 22a and nozzle 23 are preferably machined from blocks of propellant and are cemented to the cylindrical grain 22, after which the entire assemblage is wrapped with a plurality of layers of rubber-impregnated fabric to form the casing 21.

Figure 4:
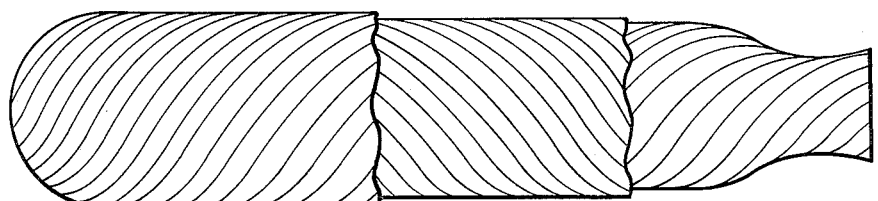
FIGURE 4 is a view of a rocket motor case, according to my invention, with a portion removed to show the method of construction of the case.

FIGURE 4 illustrates the plurality of layers of rubber-impregnated fabric applied in alternating directions to the propellant grain to build up the rocket motor case.

The perforation in the grain of rocket motor 20 can be a circular perforation because, as the propellant burns, the area of the nozzle increases so as to offset the increased burning surface of the propellant grain and a continuous build up of pressure in the rocket motor does not result. By the proper proportioning of the area of the nozzle 23 and the relative burning rates of the propellant compositions used to make the nozzle 23 and the cylindrical portion 22, the pressure in the motor can be maintained substantially constant throughout the combustion period.

Ordinarily, combustion will cease when the propellant grain is consumed; however, if it is desired that the rocket case also be consumed, a sufficient amount of oxidizer can be included in the rubber-impregnated fabric to support combustion of the case and the rocket motor case will also be consumed after burnout.

Internal pressures up to about 400 pounds per square inch can be tolerated with the rocket motor case of this invention when rubber-impregnated fabric is used, and pressure up to about 1,000 pounds can be tolerated when the fabric is reinforced with metal wires or metal strips or with metal mesh, such as hardware cloth.

Either natural or synthetic rubber can be employed to impregnate the fabric used in building up the rocket motor case of this invention. However, preferred rubber compounds are syntheic rubber such as polybutadiene or a copolymer of butadiene and a heterocyclic nitrogen base, such as methylvinylpyridine. Any of the solid inorganic oxidizing salts, such as ammonium nitrate or ammonium perchlorate can be added to the rubber-impregnated fabric to provide a rocket motor case which is completely consumed after burnout.

The propellant grain can be constructed from any rubber binder and solid, inorganic oxidizing salt; however, preferred formulations are disclosed and claimed in copending application Serial No. 574,041, filed March 26, 1956, by B. W. Williams et al. A particularly preferred binder composition comprises a copolymer of a conjugated diene containing 4 to 6 carbon atoms per molecule and at least one

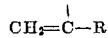

substituted heterocyclic nitrogen base selected from the group consisting of pyridine, quinoline, an alkyl substituted pyridine and an alkyl substituted quinoline, wherein the total number of carbon atoms in the nuclear alkyl substituents is not more than 15 and wherein R is selected from the group consisting of hydrogen and a methyl radical. A combustion catalyst, such as copper chormite, iron oxide, ammonium dichromate or a complex cyanide of iron, nickel, or copper, can be incorporated in the propellant composition. Solid, inorganic oxidizing salts which can be employed include ammonium and alkali metal salts of nitric and perchloric acids, and mixtures thereof. Ammonium nitrate and ammonium perchlorate are the preferred oxidizers for use in the propellant compositions of this invention. Other compounding agents, including carbon black and a rubber plasticizer, can be employed in the solid propellant formulation.

The rocket motor of this invention has particular utility as a JATO motor and as a booster or intermediate stage for rocket propelled missiles. Tire building machinery can be adapted to wrapping the rubber-impregnated fabric onto the propellant grain.

Reasonable variation and modification are possible in the scope of this disclosure without departing from the spirit and scope of the invention.

That which is claimed is:

1. A rocket motor which is entirely consumed at burnout of the propellant consisting essentially of a cylindrical longitudinally perforated solid propellant charge closed at one end; an exhaust nozzle fabricated from solid propellant operatively secured to the open end of said charge; a casing consisting essentially of a plurality of layers of rubberized fabric reinforced with metal wire and wrapped about the outer surface of said propellant and cured with said propellant so as to be bonded thereto; and means to ignite said propellant within said perforation.

2. A rocket motor which is entirely consumed at burnout of the propellant consisting essentially of a cylindrical, longitudinally perforated solid propellant charge closed at one end; an exhaust nozzle fabricated from solid propellant cemented to the open end of said charge; a casing consisting essentially of a plurality of layers of rubberized fabric wrapped about the outer surface of said propellant and cured with said propellant so as to be bonded thereto; and means to ignite said propellant within said perforation.

3. A rocket motor which is entirely consumed at burnout of the propellant consisting essentially of a cylindrical, longitudinally perforated solid propellant charge closed at one end; an exhaust nozzle fabricated from solid propellant operatively secured to the open end of said charge; a casing consisting essentially of a plurality of layers of rubberized fabric, containing sufficient oxidizer to support combustion of the fabric, wrapped about the outer surface of said propellant and cured with said propellant so as to be bonded thereto; and means to ignite said propellant within said perforation.

4. A rocket motor which is entirely consumed at burnout of the propellant consisting essentially of a cylindrical, longitudinally and circularly perforated solid propellant charge closed at one end; an exhaust nozzle fabricated from solid propellant, comprising ammonium nitrate and a rubber binder, operatively secured to the open end of said charge; a casing consisting essentially of a plurality of layers of rubberized fabric wrapped about the outer surface of said propellant and cured with said propellant so as to be bonded thereto; and means to ignite said propellant within said perforation.

References Cited in the file of this patent

UNITED STATES PATENTS

| | | |
|---|---|---|
| 2,114,214 | Damblanc | Apr. 12, 1938 |
| 2,229,208 | Holm et al. | Jan. 21, 1941 |
| 2,539,404 | Crutchfield et al. | Jan. 30, 1951 |
| 2,564,695 | Johnson | Aug. 21, 1951 |
| 2,703,960 | Prentiss | Mar. 15, 1955 |
| 2,780,996 | Hirsch et al. | Feb. 12, 1957 |
| 2,816,418 | Loedding | Dec. 17, 1957 |
| 2,877,504 | Fox | Mar. 17, 1959 |

FOREIGN PATENTS

| | | |
|---|---|---|
| 507,651 | Great Britain | Sept. 10, 1937 |